United States Patent [19]
Waterbury

[11] 3,780,702
[45] Dec. 25, 1973

[54] POWER OPERATED ANIMAL FEEDING AND WATERING DEVICE

[76] Inventor: Richard N. Waterbury, 4582 Banner Dr., Long Beach, Calif. 90807

[22] Filed: Nov. 6, 1972

[21] Appl. No.: 303,679

[52] U.S. Cl............ 119/51.13, 119/51.5, 119/51.12
[51] Int. Cl................................................ A01k 5/02
[58] Field of Search...................... 119/51.13, 51.12, 119/51.11, 51.5, 56

[56] References Cited
UNITED STATES PATENTS

| | | | |
|---|---|---|---|
| 1,966,017 | 7/1934 | McEvoy | 119/51.12 |
| 2,528,742 | 11/1950 | Coffing | 119/51.12 |
| 2,791,984 | 5/1957 | Franklin | 119/51.12 |
| 3,468,291 | 9/1969 | Allen | 119/51.12 |

Primary Examiner—Hugh R. Chamblee
Attorney—William C. Babcock

[57] ABSTRACT

Power-operated device for periodically supplying an animal with a predetermined quantity of food, as well as maintaining a receptacle with water at a predetermined level, and from which receptacle the animal may quench its thirst.

8 Claims, 6 Drawing Figures

PATENTED DEC 25 1973 3,780,702
SHEET 1 OF 2
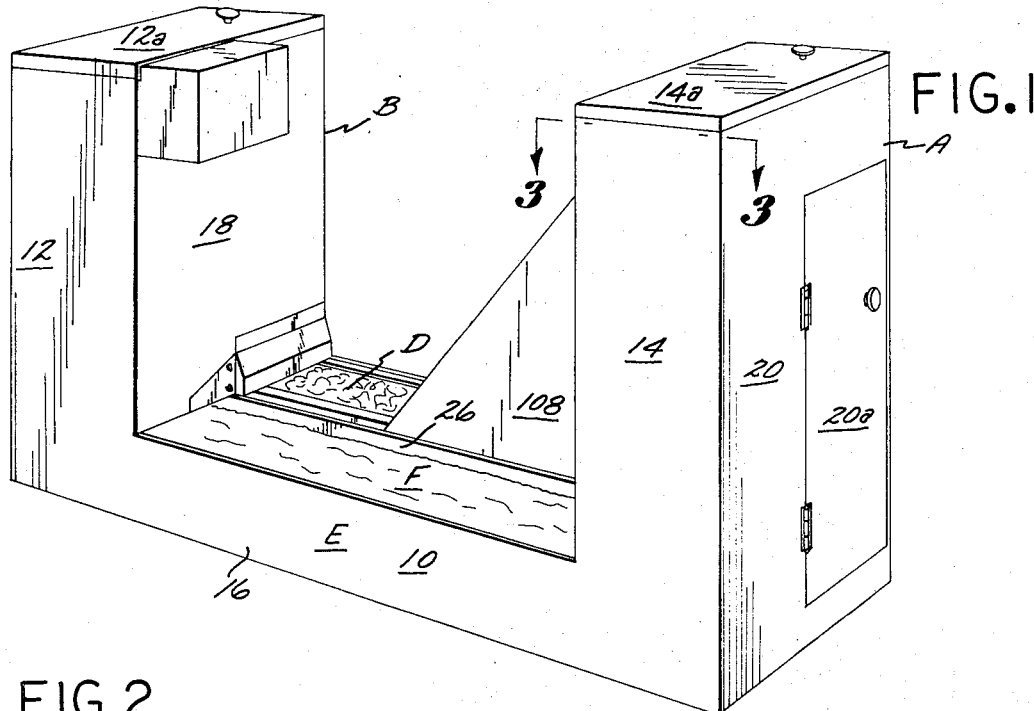
FIG.1
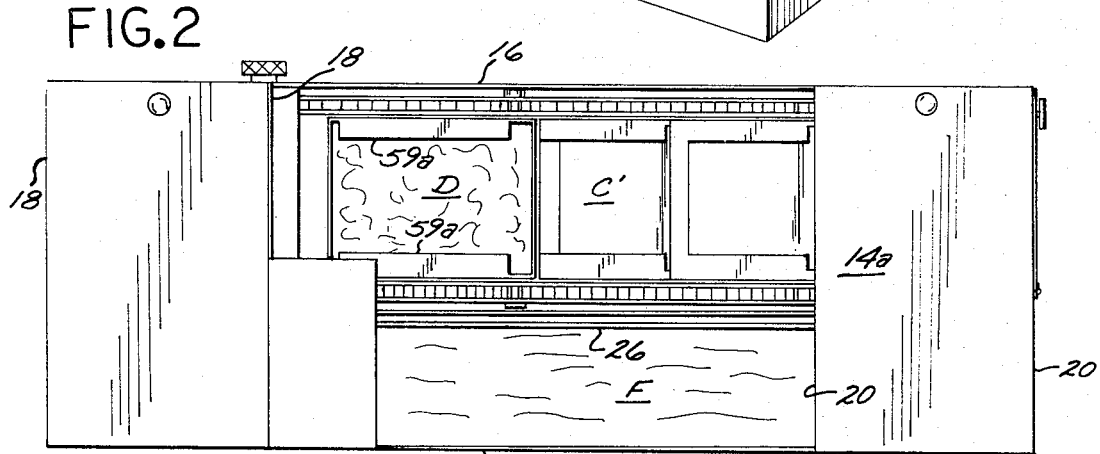
FIG.2
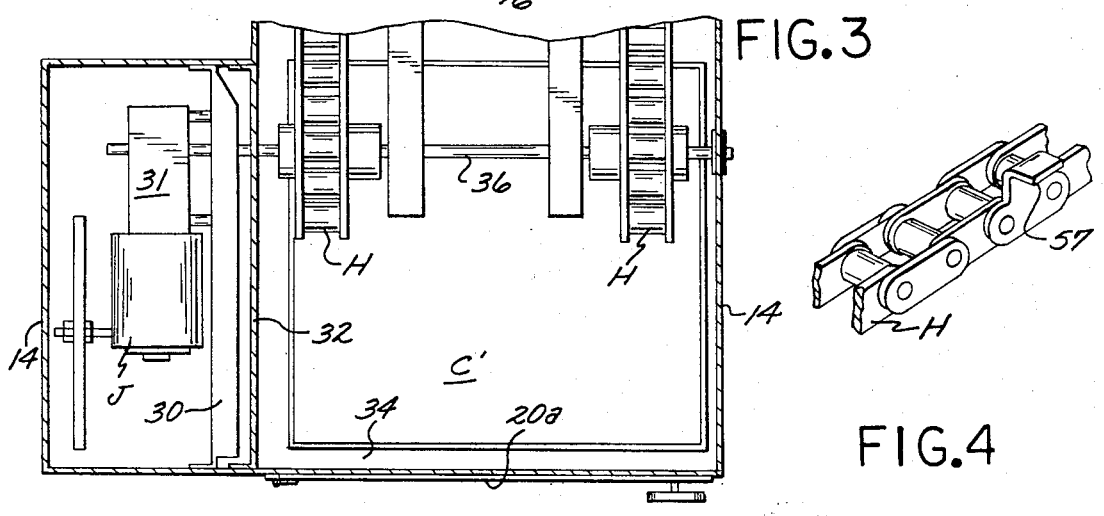
FIG.3
FIG.4

POWER OPERATED ANIMAL FEEDING AND WATERING DEVICE

BACKGROUND OF THE INVENTION

1. Field of the Invention

Power operated animal feeding and watering device.

2. Description of the Prior Art

Owners of pets, particularly dogs, are subjected to the inconvenience that when they are going to be away from their homes for several days, feeding arrangements must be made for the pets during their absence. Although kennels are available for the boarding of pets during such absences, many pet owners dislike placing their animals in a kennel due to the possibility of the boarded animal acquiring a disease. A second alternative during a pet owner's absence is to have a friend or neighbor periodically make a trip to the owners house to feed the pet, which many pet owners refuse to do in view of the inconvenience involved.

The primary purpose in devising the present invention is to supply a power-operated device that periodically provides a predetermined quantity of food for a pet, as well as a constant source of water for drinking purposes, which eliminates the necessity of taking a pet to a kennel or have a friend or neighbor feed the pet during an owner's absence.

SUMMARY OF THE INVENTION

A power-operated device that includes an enclosed structure in which a plurality of food-containing trays are stacked one above the other and at timed intervals are sequentially moved to a position where the food therein may be consumed by a pet. Concurrently, as each tray containing dry food is moved to a position where the food may be consumed, a spray of water is automatically discharged thereon to moisten the same. As each tray containing food is advanced to a position where it can be consumed by a pet, the tray therein-front that has been emptied by the pet is advanced to an enclosed storage space.

The device also includes a receptacle that contains water for the pet, with the water level at all times being maintained at a predetermined height by a float valve assembly.

BRIEF DESCRIPTION OF THE DRAWINGS

FIG. 1 is a perspective view of the pet feeding and watering device;

FIG. 2 is a top plan view of the device;

FIG. 3 is a fragmentary transverse cross-sectional view of the device taken on the line 3—3 of FIG. 1;

FIG. 4 is a perspective view of a section of one of the actuator chain belts;

DESCRIPTION OF THE PREFERRED EMBODIMENT

The power-operated pet feeder and watering device A includes a housing B that has a lower central portion 10 to which trays C containing pet food D are sequentially moved from an upwardly extending first housing portion 12. The food D when the tray C containing same is disposed in the central portion 10 is available for consumption by a pet. A receptacle E is transversely positioned relative to the central portion 10, and at all times has a supply of water F maintained therein by a float valve assembly G that will be explained in detail later.

A pair of transversely spaced endless belts H are situated within the confines of the housing B and are periodically actuated by an electric motor J to move the trays C from the first housing portion 12 to the central portion 10. Concurrently with movement of trays C containing food D to central portion 10, trays C' that have been emptied of food by the pet (not shown) are moved to a second housing portion 14 for storage purposes. Periodically, trays C' are removed from second housing portion 14, cleaned, and refilled with food D to again be used in the device A.

Figure 6:
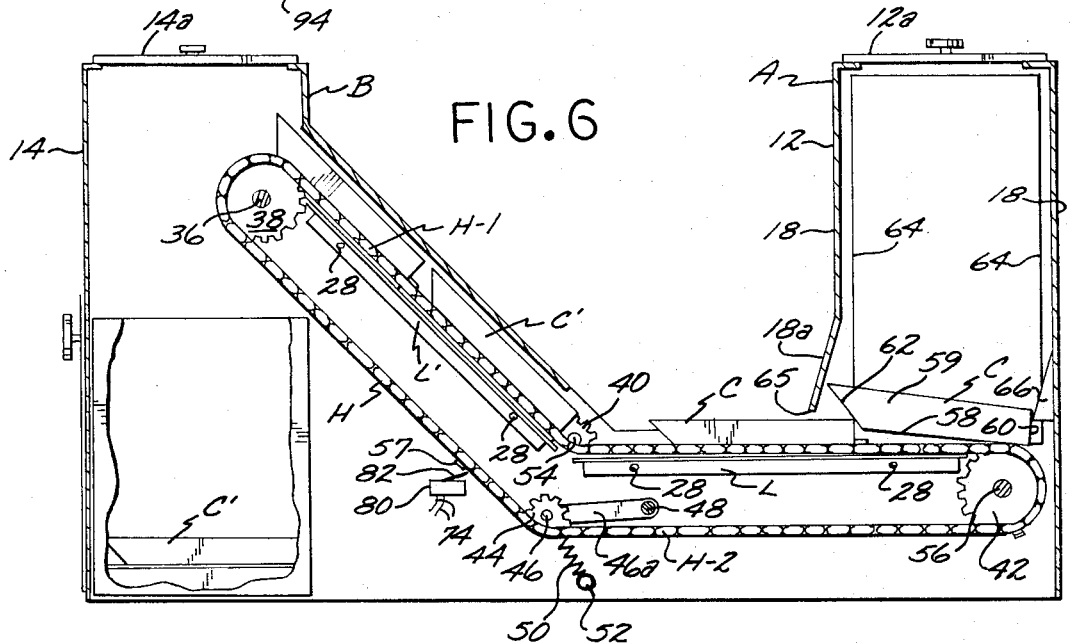
FIG. 6 is a longitudinal cross-sectional view of the device.

A timing assembly K that is preferably electrically driven is situated in a fixed position in the housing B and controls operation of the electric motor J. The trays C and C', when being moved by the belts H are slidably supported on first and second sets of rails L and L', as best seen in FIG. 6. First housing portion 12 supports a nozzle M from which water is automatically sprayed onto food D in a tray C when the tray has been moved to the central housing portion 10. The nozzle M will only be used when the food D is of the dry type.

The housing B is defined by two parallel, laterally spaced side walls 16 that are in the form of a U and define the sides of central portion 10 and sides of the first and second housing portions 12 and 14. The parts of the side walls 16 partially defining the first and second housing portions 12 and 14 have first and second pairs of vertically extending end walls 18 and 20 secured thereto, as shown in FIG. 1. The most outwardly disposed end wall 20 has a hinged access door 20a provided therein, as shown in FIG. 1.

The left hand side wall 16 as viewed in FIG. 1, in cooperation with a bottom 22, pair of endwalls 24 and interior side wall 26 cooperate to define the water-holding receptacle E. The first and second housing portions 12 and 14 have the upper open ends thereof closed by removable flanged first and second covers 12a and 14a, respectively.

The sets of first and second rails L and L' are held in fixed positions within housing B, as shown in FIG. 6, by rods 28 that extend between side walls 16. A horizontal bracket 30 is secured to the interior of second housing portion 14, as shown in FIG. 3, and serves to support the motor J and a gear reduction unit 31 therefrom. The motor J and gear reduction unit 31 are disposed to the left of a vertical partition 32. The partition 32 and the balance of the second housing portion 14 cooperate to define a confined space 34 in which the empty trays C' are discharged into for storage purposes, as will later be explained. The empty trays C' may be removed from confined space 34 by use of the door 20a.

Gear reduction unit 31 drives a first horizontal shaft 36 on which two laterally spaced sprockets 38 are mounted, which sprockets engage the pair of endless link belts H. The upper reaches H-1 of belts H extend downwardly at an angle from sprockets 38 to engage first idling sprockets 40 and then extend to the right, as viewed in FIG. 6, in a substantially horizontal plane to engage second sprockets 42. The belts H, after passing over second sprockets 42, develop into second lower reaches H-2 that are parallel to the upper reaches H-1. The lower reaches H-2 are maintained in the above-described configuration by second idling sprockets 44 that are rotatably supported on a shaft 46. Shaft 46 is rotatably supported on the end portions of two laterally spaced arms 46a that are pivotally mounted on a transverse pin 48 that extends between side wall 26 and one of the side walls 16. Two tensioned springs 50 are secured to arms 46a and to a second pin 52 that extends between sidewall 26 and one of the side walls 16, as shown in FIG. 6. Idling sprocket 40 and second sprocket 42 are rotatably supported by transverse shafts 54 and 56 respectively that are journaled by conventional means within the housing B.

The pair of endless belts H may be of the chain type as shown in FIG. 4, or formed from a material such as rubber or the like. Irrespective of the material from which the belts H are formed, the pairs of belts have a number of pairs of transversely aligned lugs 57 secured thereto that extend inwardly towards one another. One of the lugs 57 is shown in FIG. 4. The pair of belts H is spaced apart wider than the distance between the sets of rails L and L', and with the upper reaches H-1 being situated above the rails.

The trays C, as may be seen in FIG. 6, are stacked one above the other within first housing portion 12. Each tray C includes a bottom 58, pair of sidewalls 59, rear end wall 60 normally disposed to bottom 58, and a forwardly disposed end wall 62 that extends upwardly at an angle from the bottom. Guide means 64 are provided within first housing portion 12 to maintain the stacked trays C therein in vertical alignment. The inwardly positioned end wall 18 of first housing portion 12 has a forwardly flared lower end 18a, as shown in FIG. 6, that cooperates with the first set of rails L to define an opening 65 through which the lowermost one of the trays C may move towards the central portion 10 of the housing when the bottom 58 of the tray C is in full engagement with the first set of rails L.

The first housing portion 12 has a triangle-shaped tray positioner 66 therein that slidably engages the rear end wall 60 of the lowermost tray C and in cooperation with the rear end wall 60 of the tray immediately in front thereof supports the lowermost tray at an angle where it cannot pass through opening 65. When the tray C in front of the lowermost tray in the first housing portion 12 has moved completely through opening 65, the lowermost tray may assume a horizontal position on the first set of rails L. The trays C are sequentially moved from the confines of the first housing portion 12 to the central housing portion 10 by the pair of belts H being driven for a pair of lugs 57 to contact the rearward end wall 60 of a tray C that has the bottom 58 in full contact with the set of rails L.

Figure 5:
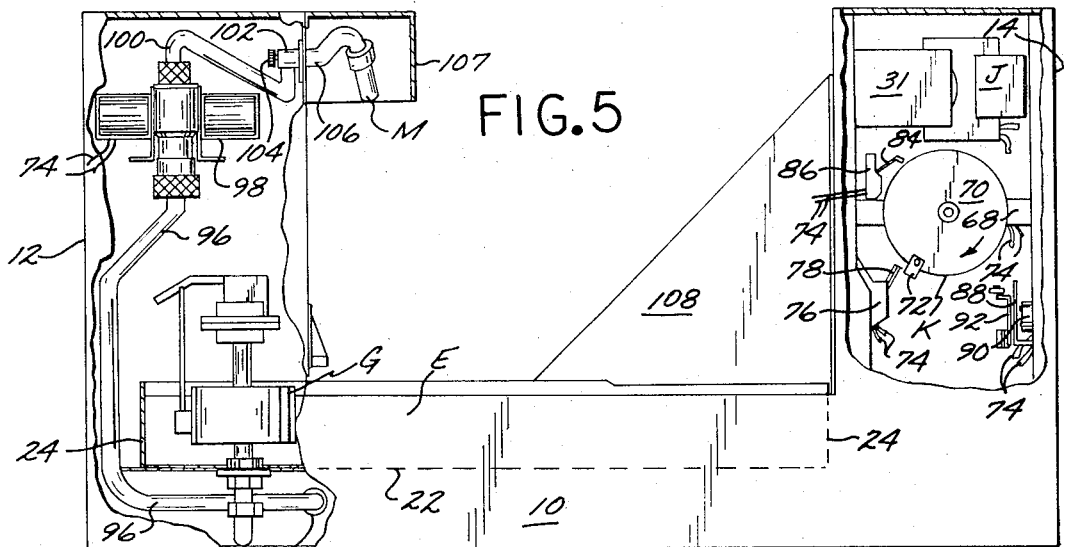
FIG. 5 is a side elevational view of the device with portions thereof broken away to illustrate the interior thereof.

The timing assembly K is illustrated in FIG. 5 as being situated in second housing portion 14. However, it will be apparent that the timing device K may be situated at any desired location in the housing B where easy access may be had thereto.

The timing assembly K includes a second electric motor 68 that by gear means (not shown) rotates a disk 70 that completes one revolution in a desired number of hours. An actuator 72 is secured to disk 70 and projects outwardly therefrom. The first electric motor J is included in an electric circuit 74 that includes a first, normally open spring-loaded switch 76 that is closed only when actuator 72 is in contact with a projecting arm 78 thereof. When arm 78 is so contacted first motor J drives the pair of belts H where one of the sets of lugs 57 thereon engages the rear wall 60 of the lowermost tray C in first housing portion 12 and moves the tray towards the central housing portion 10.

A second normally closed switch 80 that has a spring loaded arm 82 is provided and so located relative to the pair of belts H, as shown in FIG. 6, that when one of the trays C has been moved to a desired location on the central housing portion 10 where the food D in the tray is available to the pet (not shown) one of the lugs 57 contacts the arm 82 and opens switch 80. Operation of the first motor J now ceases, as does further movement of the tray C that has been advanced to the central housing portion 10.

The second electric motor 68 continues to operate with the actuator 72 subsequently contacting a spring loaded arm 84 of a normally open third electric switch 86 to close the latter. Switch 86, as may be seen in FIG. 5, is a part of circuit 74. A fourth electric switch 88 is provided and included as a part of circuit 74. Fourth electric switch 88 includes a solenoid 90 that is included as a part of circuit 74. The solenoid 90 each time it is energized alternately moves a spring-loaded armature assembly 92 to an open or a closed position.

When third electric switch 86 is closed, solenoid 90 is energized to move armature assembly 92 to a closed position and complete the circuit 74 to first motor J around the second open electric switch 80. However, the circuit 74 to first motor J will not be completed until actuator 72 again contacts arm 78, whereupon the circuit to first motor J is completed and the belts H are driven to move another of the trays C from the first housing portion 12 to central housing portion 10. The lugs 57, as they move past arm 82, allow the spring-loaded arm to return to a position where the switch 80 is closed, and this closing of the switch energizing solenoid 90 to move armature assembly 92 to the open position. The above-described operation is repeated until all of the trays C have been advanced to the central housing portion 10.

As a tray C is advanced to the central housing portion 10, the lugs 57 on the pair of belts H push the trays C' thereinfront of the advanced tray upwardly on the second set of rails L' to be ultimately dumped into the confined space 34 of second housing portion 14 for storage purposes.

The housing B is provided with a water inlet 94 that is connectable to a source of domestic water (not shown). Tubular means 96 of a conventional nature connect the inlet to the float valve assembly G that maintains water F at a desired constant level in the receptacle E. The tubular means 96 is also connected to a normally closed solenoid-operated valve 98. Valve 98 has a first water discharge line 100 extending therefrom to a second manually operated valve 102. The second valve 102 is operated by a handle 104. A second water discharge line 106 extends from second valve 102 to the nozzle M located in the upper part of housing B and so situated that a spray of water (not shown) is directed downwardly onto dry food D situated in a tray C when the tray is moved to the central portion 10 of the housing.

The solenoid-operated valve 98 is preferably spring loaded and remains in the closed position except when electrically operated. Valve 98 is so connected to the circuit 74 as to be concurrently energized with the energization of first motor J. When it is not desired to have a spray of water directed onto the food D in a tray C as the tray moves to the central portion 10 of housing B, the handle 104 may be placed in a closed position. Also, the handle 102 may be used to adjust the valve 102 to control the rate of water flow to the nozzle M. The nozzle M is preferably situated in a small hood 107 that projects outwardly from the upper portion of first housing portion 12. Two laterally spaced, triangularly shaped shields 108 extend upwardly from the side wall 26 and one side wall 16 to prevent the pet being fed from having contact with the inclined portions of the upper reaches H-1 of the pair of belts H. The side walls 59 of the trays C preferably terminate on their upper ends in longitudinally extending flanges 59a, to permit the trays filled with food D to be stacked one above the other in first housing portion 12 without the food contacting the bottoms 58 of the trays situated thereabove.

The use and operation of the invention has been described previously in detail and need not be repeated.

I claim:

1. A power operated device for automatically making available to a pet predetermined quantities of food as well as constantly maintaining a supply of drinking water, said device including:
   a. a housing that includes a central portion that has first and second portions extending upwardly therefrom, said first and second portions defining first and second confined spaces within the interior thereof, said housing including first and second door means to permit access to said first and second confined spaces, said first portion having a first opening therein and said second portion a second opening therein that faces said first opening, said central portion defining a longitudinally extending receptacle along one side thereof in which drinking water is maintained, and said central portion having a longitudinal opening in the upper portion thereof that extends parallel to said receptacle,
   b. a first set of rails supported from said cental portion below said longitudinal opening therein and extending through said first opening in said first portion into said first confined space;
   c. a second set of rails longitudinally aligned with said first set and extending upwardly therefrom at an angle to pass through said second opening into the upper part of said second confined space;
   d. two laterally spaced endless belts disposed outwardly from said first and second sets of rails, said belts including upper reaches that are disposed above said first and second set of rails, and said upper reaches extending through said opening in said central portion and through said first and second openings into said first and second confined spaces;
   e. sprocket means for rotatably supporting said two belts from said housing;
   f. a plurality of pairs of transversely aligned engaging means supported from said belts in longitudinally spaced relationship thereon, said engaging means on said upper reaches extending over said first and second sets of rails;
   g. a plurality of trays of less width than the spacing between said rails that are stacked one above the other in said first confined space, with the lowermost tray resting on said first set of rails, and each of said trays containing a predetermined quantity of said food;
   h. a first electric motor for driving said belts;
   i. an electric circuit for supplying electric energy to said first motor;
   j. timing means for completing said circuit to said first motor at periodic intervals for said first motor to drive said belts for one of said pairs of engaging means to engage the lowermost one of said trays in said first confined space and move said tray to a first position on said central portion where said food therein may be consumed by said pet, with each of said trays, after being emptied of food by said pet, being sequentially moved upwardly on said second set of rails by said engaging means as additional of said trays full of food are advanced to said first position, and each of said emptied trays upon reaching the upper end of said second set of rails falling therefrom by gravity into said second confined space for storage;
   k. first normally closed switching means forming a part of said circuit that are opened by contact with one of said engaging means to break the circuit to said first motor when said belts and engaging means have moved one of said trays to said first position;
   l. second normally open switching means forming a part of said circuit that is temporarily closed by said timer to complete said circuit about said first switching means when the latter is open to permit said circuit to be completed to said first motor to again advance another of said trays from said first confined space to said first postion; and
   m. third means for permitting but one of said trays to be removed from said first confined space by one of said pair of engaging means when said first motor is energized by said circuit being completed by said timer.

2. A device as defined in claim 1 which in addition includes:
   n. a water inlet mounted on said housing; and
   o. float valve means in communication with said inlet and said receptacle for maintaining said drinking water at a predetermined level therein.

3. A device as defined in claim 2 in addition includes:
   p. a nozzle supported from said first portion and so disposed as to direct a spray of water into food in one of said trays when said tray is in said first position; and
   q. a normally closed solenoid-operated valve in communication with said inlet and said nozzle, with said solenoid-operated valve being included as a part of said circuit and being electrically energized to open to permit water to flow to said nozzle concurrently with the energization of said first motor.

4. A device as defined in claim 3 which in addition includes:
   r. a hood that extends outwardly from said first portion and has said nozzle situated therein.

5. A device as defined in claim 1 which in addition includes:
   n. shield means that extend upwardly from said central portion on opposite sides of said second set of rails to prevent said pet contacting said upper reaches of said belts adjacent thereto or knocking empty trays from said second set of rails prior to said empty trays being delivered to said second confined space.

6. A device as defined in claim 1 in which said timing means includes:

n. a second electric motor that operates constantly when said device is operating and is included as a part of said circuit;
o. a disk driven at slow speed by said second motor;
p. a lug mounted on said disk and extending outwardly therefrom; and
q. a first normally open switch that includes a spring-loaded arm projecting outwardly therefrom, said first switch being included as a part of said circuit, and said arm when contacted by said lug moving to a postion to close said circuit to said first motor to energize the latter.

7. A device as defined in claim 1 in which each of said trays is formed with a flat bottom, a rear end wall normal to said bottom, a front end wall that extends upwardly and forwardly, and connecting side walls, with said third means being an actuator inside said first confined space that moves the tray above the lowermost tray forwardly as said lowermost tray is moved from said first confined space, and said forward movement and the contact of said front wall with the rear wall of said lowermost tray resulting in the positioning of said tray above said lowermost tray at an angle to prevent it moving from said first portion until such time as said lowermost tray has been removed from said first portion and said tray that was previously thereabove rests on said first set of rails.

8. A device as defined in claim 1 in which said pairs of engaging means are pairs of L-shaped lugs secured to said belts, and said belts are of the chain link type.

* * * * *